US012573014B2

(12) United States Patent
Chien et al.

(10) Patent No.: US 12,573,014 B2
(45) Date of Patent: Mar. 10, 2026

(54) METHOD FOR DETECTING VEHICLE DEVIATION, ELECTRONIC DEVICE, AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 371 days.

(21) Appl. No.: 18/199,878

(22) Filed: May 19, 2023

(65) Prior Publication Data

US 2024/0202887 A1 Jun. 20, 2024

(30) Foreign Application Priority Data

Dec. 20, 2022 (CN) .......................... 202211643088.X

(51) Int. Cl.
G06T 5/80 (2024.01)
G06T 3/04 (2024.01)
(Continued)

(52) U.S. Cl.
CPC .................. G06T 5/80 (2024.01); G06T 3/04 (2024.01); G06T 5/70 (2024.01); G06T 7/12 (2017.01);
(Continued)

(58) Field of Classification Search
CPC .... G06T 5/80; G06T 7/80; G06T 7/12; G06T 7/194; G06T 7/73; G06T 3/04;
(Continued)

(56) References Cited

U.S. PATENT DOCUMENTS

2022/0375234 A1* 11/2022 Zhang ................... G06V 10/44

FOREIGN PATENT DOCUMENTS

CN 105966314 9/2016
CN 110647850 1/2020

OTHER PUBLICATIONS

Gaikwad, Vijay, and Shashikant Lokhande. "Lane departure identification for advanced driver assistance." IEEE, published 2014 (Year: 2014).*

(Continued)

*Primary Examiner* — Oneal R Mistry
*Assistant Examiner* — Nhut Huy Pham
(74) *Attorney, Agent, or Firm* — ScienBiziP, P.C.

(57) ABSTRACT

A method for detecting vehicle deviation, an electronic device and a storage medium are provided. In the method, a first foreground image is acquired, a first corrected image is obtained by performing a distortion correction on the first foreground image and an aerial view is obtained. Based on the aerial view, a distribution map of non-zero pixel points is generated. An initial position of a left lane line and an initial position of a right lane line in the aerial view are determined. A first curve corresponding to the left lane line and a second curve corresponding to the right lane line are fitted. It can be determined whether the vehicle deviates from any lane line according to a distance between the vehicle and any lane line. The method can effectively detect lane lines, and improve an accuracy of identifying lane line detection.

20 Claims, 5 Drawing Sheets

(51) Int. Cl.

| | |
|---|---|
| *G06T 5/70* | (2024.01) |
| *G06T 7/12* | (2017.01) |
| *G06T 7/194* | (2017.01) |
| *G06T 7/73* | (2017.01) |
| *G06T 7/80* | (2017.01) |
| *G06V 20/56* | (2022.01) |

(52) U.S. Cl.
CPC ................ *G06T 7/194* (2017.01); *G06T 7/73* (2017.01); *G06T 7/80* (2017.01); *G06T 2200/04* (2013.01); *G06T 2207/10032* (2013.01); *G06T 2207/20021* (2013.01); *G06T 2207/30256* (2013.01)

(58) Field of Classification Search
CPC ................... G06T 5/70; G06T 2200/04; G06T 2207/10032; G06T 2207/20021; G06T 2207/30256
See application file for complete search history.

(56) References Cited

OTHER PUBLICATIONS

Mithi "Road Lane Lines Detection using Advanced Computer Vision Techniques" Medium, published 2017 (Year: 2017).*
Zheng, Xueting, et al. "Lane Departure Warning Model Based on Slope." IEEE, published 2021. (Year: 2021).*
Huang, Junjie, et al. "Lane marking detection based on adaptive threshold segmentation and road classification." 2014 IEEE (Year: 2014).*
Wong, Man Kiat, et al. "A visual approach towards forward collision warning for autonomous vehicles on Malaysian public roads." F1000Research 10, published Sep. 16, 2021. (Year: 2021).*
Ernst, Stefan, et al. "Camera calibration for lane and obstacle detection." IEEE, published 1999 (Year: 1999).*
Mithi "Road Lane Lines Detection using Advanced Computer Vision Techniques" Medium (Year: 2017).*
Gaikwad, Vijay, and Shashikant Lokhande. "Lane departure identification for advanced driver assistance." IEEE (Year: 2014).*

\* cited by examiner

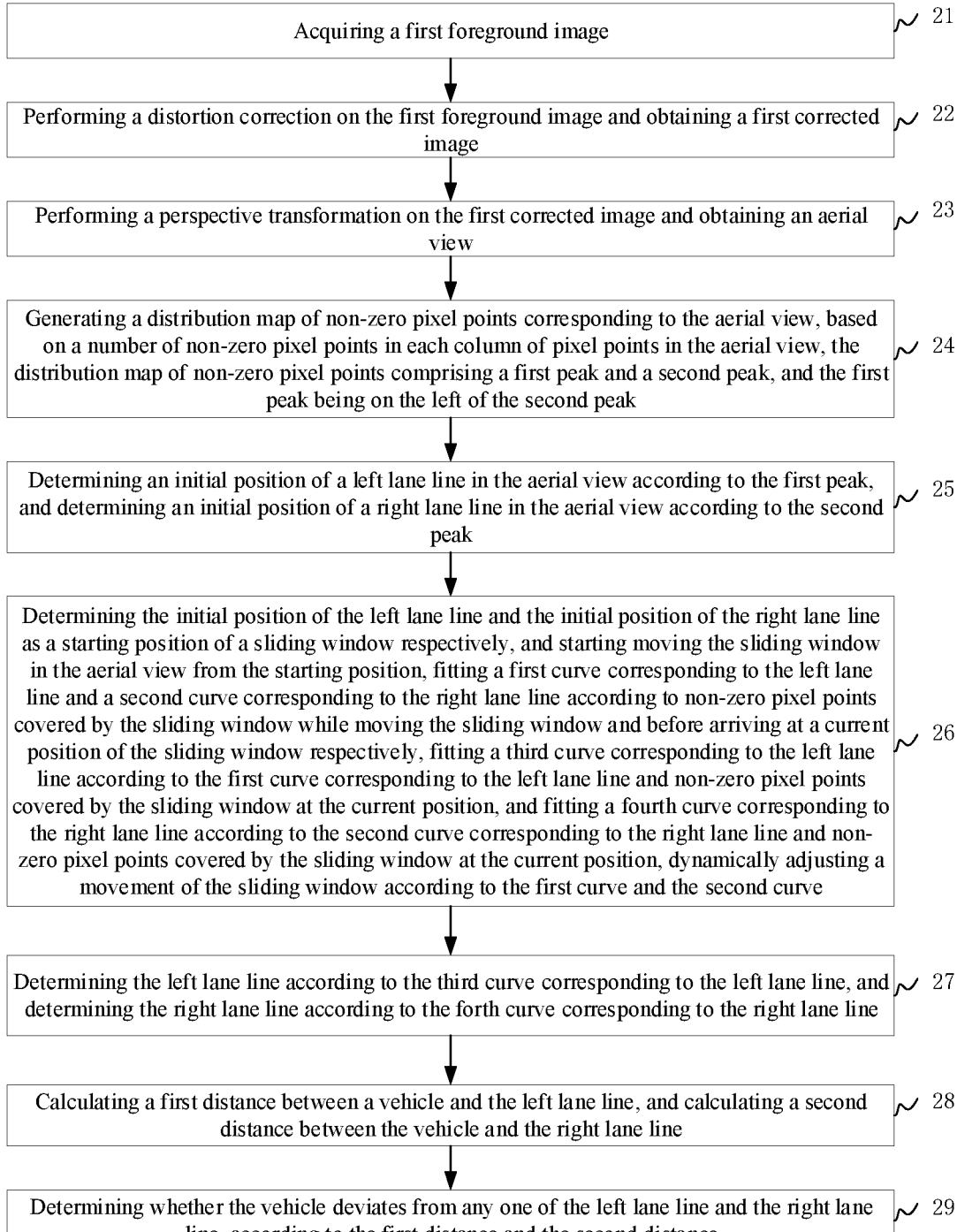

Acquiring a first foreground image ⟿ 21

Performing a distortion correction on the first foreground image and obtaining a first corrected image ⟿ 22

Performing a perspective transformation on the first corrected image and obtaining an aerial view ⟿ 23

Generating a distribution map of non-zero pixel points corresponding to the aerial view, based on a number of non-zero pixel points in each column of pixel points in the aerial view, the distribution map of non-zero pixel points comprising a first peak and a second peak, and the first peak being on the left of the second peak ⟿ 24

Determining an initial position of a left lane line in the aerial view according to the first peak, and determining an initial position of a right lane line in the aerial view according to the second peak ⟿ 25

Determining the initial position of the left lane line and the initial position of the right lane line as a starting position of a sliding window respectively, and starting moving the sliding window in the aerial view from the starting position, fitting a first curve corresponding to the left lane line and a second curve corresponding to the right lane line according to non-zero pixel points covered by the sliding window while moving the sliding window and before arriving at a current position of the sliding window respectively, fitting a third curve corresponding to the left lane line according to the first curve corresponding to the left lane line and non-zero pixel points covered by the sliding window at the current position, and fitting a fourth curve corresponding to the right lane line according to the second curve corresponding to the right lane line and non-zero pixel points covered by the sliding window at the current position, dynamically adjusting a movement of the sliding window according to the first curve and the second curve ⟿ 26

Determining the left lane line according to the third curve corresponding to the left lane line, and determining the right lane line according to the forth curve corresponding to the right lane line ⟿ 27

Calculating a first distance between a vehicle and the left lane line, and calculating a second distance between the vehicle and the right lane line ⟿ 28

Determining whether the vehicle deviates from any one of the left lane line and the right lane line, according to the first distance and the second distance ⟿ 29

FIG. 2

METHOD FOR DETECTING VEHICLE DEVIATION, ELECTRONIC DEVICE, AND STORAGE MEDIUM

FIELD

The present application relates to an artificial intelligence technology, specifically a method for detecting vehicle deviation, an electronic device and a storage medium.

BACKGROUND

Lane detection is an important technology in driverless or assisted driving scenes. Lane detection refers to a detection of traffic indicator lines (e.g., lane line) on the road. Lane detection can be used to determine whether the vehicle has any deviation during a driving procedure. However, it cannot be effectively detected whether the vehicle has deviated as complexity of roads.

BRIEF DESCRIPTION OF THE DRAWINGS

FIG. 2 shows a flowchart of a method for detecting vehicle deviation provided in an embodiment of the present application.

DETAILED DESCRIPTION

The accompanying drawings combined with the detailed description illustrate the embodiments of the present application hereinafter. It is noted that embodiments of the present disclosure and features of the embodiments can be combined, when there is no conflict.

Various details are described in the following descriptions for a better understanding of the present application, however, the present application may also be implemented in other ways other than those described herein. The scope of the present application is not to be limited by the specific embodiments disclosed below. Unless defined otherwise, all technical and scientific terms used herein have the same meaning as commonly understood by one of ordinary skill in the art to which the present application belongs. The terms used herein in the present application are only for the purpose of describing specific embodiments and are not intended to limit the present disclosure.

Figure 1:
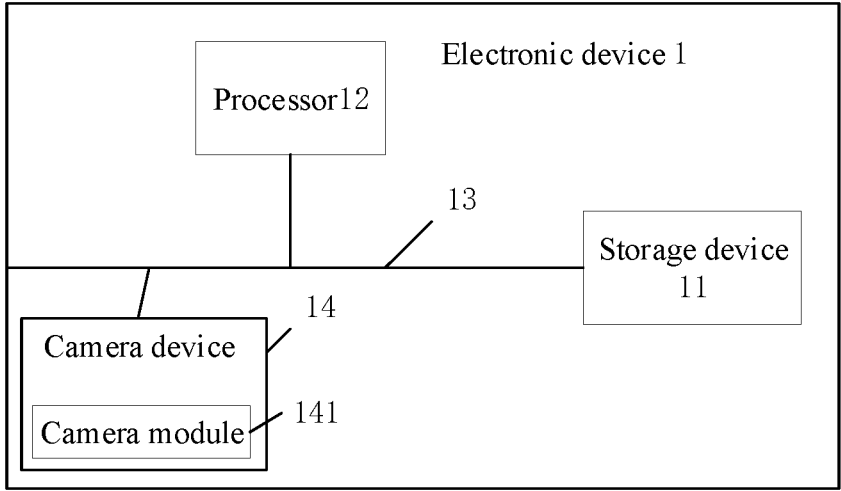
FIG. 1 shows a schematic diagram of an electronic device provided in an embodiment of the present application.

FIG. 1 is a schematic structural diagram of an electronic device provided in an embodiment of the present application. The electronic device 1 includes, but is not limited to, a storage device 11, at least one processor 12, and a camera device 14. The storage device 11, the processor 12 and the camera device 14 are connected through a communication bus 13 or directly. The electronic device 1 can be applied to vehicles, for example, an on-board device in a vehicle (for example, a vehicle machine), or an independent on-board device (for example, a computer, a laptop, a mobile phone, etc.). The camera device 14 can be an on-board camera of a vehicle, a camera of an external vehicle, such as a camera or a drive recorder, to capture images or videos in front of a vehicle.

In some embodiments, the electronic device 1 may include the camera device 14 (for example, a camera) and a camera module 141 inside the camera device 14 to capture a plurality of images or videos in front of the vehicle.

In other embodiments, the electronic device 1 may not include a camera device, but is externally connected to the camera device, for example, a drive recorder, or one or more camera devices inside the vehicle, so as to obtain a plurality of images or videos directly from the external camera device. The electronic device 1 can communicate with the drive recorder in the vehicle to obtain images or videos.

FIG. 2 is a flowchart of a method for detecting vehicle deviation provided in an embodiment of the present application. The method for detecting vehicle deviation is applied to an electronic device, such as the electronic device 1 in FIG. 1. The method can improve an accuracy of vehicle deviation detection and ensure a safety of vehicle driving. According to different requirements, the order of following blocks can be changed, and some blocks can be omitted.

In block 21, the electronic device acquires a first foreground image.

In one embodiment, the first foreground image is an image of environment in front of the vehicle taken during the vehicle is driving. The first foreground image includes at least one lane line where the vehicle is located.

In at least one embodiment, in response that the electronic device includes the camera device, the electronic device obtains the first foreground image from a camera device.

In at least one embodiment, the electronic device can obtain the first foreground image by a camera device of the vehicle (for example, the drive recorder).

By capturing images of environments in front of the vehicle, the first foreground image is obtained from captured images. Alternatively, by shooting videos of environment in front of the vehicle, the first foreground image is obtained from the captured video.

In block 22, the electronic device performs a distortion correction on the first foreground image and obtains a first corrected image.

In an embodiment, a first foreground image may be distorted due to capturing angles, rotations, a scaling and other problems of the camera device. Therefore, it is necessary to perform the distortion correction on the first foreground image.

In at least one embodiment, the electronic device establishes an image coordinate system based on the first foreground image, obtains first coordinates of each non-zero pixel point on the first foreground image based on the image coordinate system, and obtains internal parameters of a camera device that captures the first foreground image. The electronic device determines second coordinates corresponding to the first coordinates according to the internal parameters and the first coordinates, the second coordinate can be distortion-free coordinates. The electronic device calculates a distortion distance between the first coordinates and coordinates of a center point of the first foreground image, calculates an image complexity of the first foreground image according to a gray value of each pixel point on the first foreground image, and determines correction parameters of the first foreground image according to the image complexity. The electronic device determines a smoothing coefficient corresponding to the distortion distance and correction parameters, according to a preset smoothing function, smooths the first coordinates according to the smoothing coefficient and the second coordinates, and obtains the first corrected image.

In at least one embodiment, the electronic device determines a first weight of the first coordinates and a second weight of the second coordinates according to the smoothing coefficient, calculates a first product of the first weight and the first coordinates, and calculates a second product of the second weight and the second coordinates. The electronic device smooths the first coordinates according to a sum of the first product and the second product, and obtains the first corrected image.

In at least one embodiment, the first foreground image can be a distorted image, and a distorting correction needs to be performed on the first foreground image for avoiding distorting. The electronic device establishes the image coordinate system for the first foreground image, and obtains the first coordinates corresponding to each non-zero pixel point in the first foreground image. The first coordinates corresponding to the first foreground image can be coordinates with certain distortion. The internal parameters of the camera device are used to determine a degree of distortion of the first coordinates. According to the internal participation and the first coordinates, undistorted coordinates corresponding to the first coordinates can be determined as the second coordinates.

The electronic device calculates a gray value of each pixel point on the first foreground image and calculates an image complexity of the first foreground image according to the gray value of each pixel point. The electronic device calculates a sum of all the gray values to represent the image complexity, by calculating the gray value of each pixel point. When the sum of gray values of the first foreground image is larger, it is represented that content included in the first foreground image is richer, and the image complexity is higher. Furthermore, the correction parameter of the first foreground image is determined according to the image complexity. The image complexity can be input into a pre-established depth learning model, and the correction parameter is determined based on output of the pre-established depth learning model.

It may be understood that, due to capture mechanism of the camera device, when it is closer to an edge of the image, a distortion degree can be higher; when it is closer to a central region of the image, the distortion degree can be smaller. Therefore, the electronic device obtains coordinates of a central point of the first foreground image and calculates a distortion distance between the first coordinates and the coordinates of the central point. The electronic device further calculates a smoothing coefficient by using a preset smoothing function and the distortion distance, the smoothing coefficient is configured to correct the first foreground image.

In at least one embodiment, a sum of the distortion distance and the correction parameter is calculated as a target value, and based on the preset smoothing function, a positive correlation between the target value and the smoothing coefficient is obtained. When the region is closer to edges of the first foreground image, the image complexity corresponding to the first foreground image is higher, the corresponding target value and the smoothing coefficient are larger, and stronger correction processing is required. For the regions not belong to the edges of the first foreground image, the corresponding target value and the smoothing coefficients are smaller, and weaker correction processing is required. Based on the positive correlation between the target value and the smoothing coefficient, the smoothing coefficient and the second coordinates are used to smoothly correct the first coordinates for different regions of the first foreground image, thereby improving the calculation efficiency.

To improve smoothing of the first corrected image, the first weight corresponding to the first coordinates and the second weight corresponding to the second coordinates are obtained. The first weight and the smoothing coefficient are inversely related and the second weight and the smoothing coefficient are positively related, and the first coordinates is smoothly corrected using a weighting method to guarantee the authenticity of the image.

In block 23, the electronic device performs a perspective transformation on the first corrected image and obtains an aerial view.

In an embodiment of the present application, the electronic device performs preprocessing such as image grayscale, gradient threshold and color threshold and saturation threshold on the first corrected image, and removes irrelevant lane line information in the first corrected image, and obtains a binary image. The electronic device obtains the aerial view by performing a perspective transformation on the binary image. The aerial view is a three-dimensional image created by using high point perspective and aerial perspective to depict the ups and downs of the ground from a high point of view, which is more realistic than the plan view.

The electronic device uses each non-zero pixel point in the first corrected image as a target point, calculates the target point according to a coordinate transformation formula and obtains an inverse perspective transformation matrix, and obtains the aerial view based on the inverse perspective transformation matrix.

In at least one embodiment, as lane lines on the road are approximately parallel, the electronic device can avoid perspective effect of the first foreground image by performing the perspective transformation on the foreground image. Each non-zero pixel point of the first corrected image can be set as a target point, and the target point is calculated by the coordinate transformation formula to obtain the inverse perspective transformation matrix. The aerial view is obtained by performing the perspective transformation on the first corrected image according to the inverse perspective transformation matrix. For example, the aerial view can eliminate the interference of the road surroundings and the sky of the foreground image, and retains only the lanes included in a region of interest (ROI) in a lane detection procedure, for reducing the complex background calculation and facilitating the lane detection in the following procedure.

In block 24, the electronic device generates a distribution map of non-zero pixel points corresponding to the aerial view, based on a number of non-zero pixel points in each column of pixel points in the aerial view. The distribution map of non-zero pixel points includes a first peak and a second peak, and the first peak is on the left of the second peak.

In at least one embodiment, the lane lines are extended limitlessly as the vehicle is moving. The lane lines show as curves having a longitudinal trend, and the lane lines have not a large degree of curvature at a shorter distance. The lane lines with a closer section of distance can be approximated as straight lines, thus, the lane lines in the aerial view are represented as a section of lines that are almost perpendicular to the bottom of the aerial view. Considering the above conditions, a distribution map of the non-zero pixel points can be generated based on the bottom half of the aerial view.

In one embodiment, the bottom half of the aerial view can be an area closest to the vehicle.

In at least one embodiment, the distribution map of the non-zero pixel points is established based on the non-zero pixel points corresponding to the bottom half of the aerial view, and a first peak and a second peak are obtained by accumulating a total number of the non-zero pixel points in each column of the distribution map of the non-zero pixel points. The first peak can be a max value of a left area of the distribution map of the non-zero pixel points, and the second peak can be a max value of a right area of the distribution map of the non-zero pixel points. The first peak is on the left of the second peak, and there is a certain distance between the first peak and the second peak.

In block 25, the electronic device determines an initial position of a left lane line in the aerial view according to the first peak, and determines an initial position of a right lane line in the aerial view according to the second peak.

In order to improve the accuracy of identifying lane lines, the first peak is set as an initial position of the left lane line for searching the aerial view for the left lane line, and the second peak is set as an initial position of the right lane line for searching the aerial view for the right lane line. The direction for searching the left lane line and the right lane line can be up and down along the direction of the lane lines.

In block 26, the electronic device determines the initial position of the left lane line and the initial position of the right lane line as a starting position of a sliding window respectively, and starts moving the sliding window in the aerial view from the starting position. The electronic device fits a first curve corresponding to the left lane line and a second curve corresponding to the right lane line, according to non-zero pixel points covered by the sliding window while moving the sliding window and before arriving at a current position of the sliding window respectively. The electronic device fits a third curve corresponding to the left lane line according to the first curve corresponding to the left lane line and non-zero pixel points covered by the sliding window at the current position, and fits a forth curve corresponding to the right lane line according to the second curve corresponding to the right lane line and non-zero pixel points covered by the sliding window at the current position, dynamically adjusts a movement of the sliding window according to the first curve and the second curve.

According to the above embodiments, a sliding window is used to search for lane lines, and the size of the sliding window is determined according to a predetermined size. A moving distance is set by a width of the sliding window in the longitudinal direction. For example, the size of the sliding window is equal to a width of 200 pixels occupied on the aerial view, and the moving distance is equal to the width of 200 pixels occupied on the aerial view when the sliding window moves each time.

In one embodiment, the fitting method of the first curve and the second curve is the same. The initial sliding window represents the current sliding window, the electronic device determines the abscissa of an initial sliding window according to the initial position of the left lane line and the initial position of the right lane line, and obtains the non-zero pixel points in the initial sliding window according to the preset moving distance (e.g., the ordinate) and the abscissa. The electronic device obtains the coordinates of each non-zero pixel point. Furthermore, the electronic device fits the first curve and the second curve corresponding to the initial sliding window by fitting the non-zero pixels in the initial sliding window. In one embodiment, the electronic device determines the initial position of the left lane line as a starting position of a sliding window, starts moving the sliding window in the aerial view from the starting position, fits a first curve corresponding to the left lane line according to non-zero pixel points covered by the sliding window while moving the sliding window and before arriving at a current position of the sliding window. In one embodiment, the electronic device determines the initial position of the right lane line as a starting position of a sliding window, starts moving the sliding window in the aerial view from the starting position, fits a second curve corresponding to the right lane line according to non-zero pixel points covered by the sliding window while moving the sliding window and before arriving at a current position of the sliding window.

In one embodiment, the fitting method of the third curve and the forth curve is the same, the following embodiment takes the fitting of the third curve as an example. The electronic device calculates the abscissa of the sliding window at the second moving position according to the first curve corresponding to the initial sliding window and the moving distance, and the abscissa corresponding to the center of the sliding window. The sliding window corresponding to the second moving position is determined to be the current sliding window. The movement of the sliding window is dynamically adjusted according to the first curve. For example, the first curve corresponding to the initial sliding window is y=p(x), the electronic device determines a moving distance y according to the size of the sliding window, and determines the abscissa x corresponding to the center of the sliding window of the current sliding window according to the moving distance y, and fits the third curve according to non-zero pixel points of the initial sliding window and non-zero pixel points of the sliding window at the current position (e.g., the sliding window corresponding to the second moving position).

In one embodiment, the electronic device calculates the abscissa of the sliding window at the current position according to the first curve and the moving distance, for example, using the abscissa of the center of the sliding window as the abscissa of the current position of the sliding window. In an embodiment, the movement of the sliding window is dynamically adjusted according to the first curve, for example, the first curve is obtained by fitting all non-zero pixels that are covered by the sliding window before arriving at the current position when the sliding window is moving. The first curve is obtained by fitting all non-zero pixels that are covered by the sliding window when the sliding window is at the initial position. In response that the sliding window is not at the initial position, the first curve is obtained by fitting all non-zero pixels, which covered by the sliding window before arriving at the current position when the sliding window is moving. Furthermore, a next position of the sliding window is determined according to the first curve, detailed descriptions are described in FIG. 3 as below. Positions of the sliding window during the movement can be dynamically adjusted according to the first curve. The third curve can be fitted based on the first curve and the non-zero pixels covered by the sliding window at the current position.

In one embodiment, the electronic device obtains the non-zero pixel points of the first curve and the second curve respectively, calculates a number of the non-zero pixels in the current sliding window. In response that the number of the non-zero pixels in the current sliding window is greater than or equal to a preset threshold, the electronic device fits the third curve according to the non-zero pixel points of the first curve and non-zero pixel points in the current sliding window, and the electronic device fits the forth curve according to the non-zero pixel points of the second curve and non-zero pixel points in the current sliding window.

In one embodiment, the electronic device obtains the non-zero pixel points of the first curve, and fits the first curve according to the non-zero pixel points covered by the sliding window corresponding to the starting position, and fits the first curve according to the non-zero pixel points covered by a plurality of sliding windows.

In one embodiment, when searching the current sliding window, the electronic device obtains the non-zero pixel points from the first curve, and calculates the number of non-zero pixel points in the current sliding window according to the first curve. In response that the number of non-zero pixels in the current sliding window is less than a preset threshold, the electronic device does not fit the non-zero pixels in the current window. In response that a number of non-zero pixels in the current sliding window is greater than or equal to the preset threshold, the electronic device fits the third curve according to the non-zero pixel points of the first curve and non-zero pixel points in the current sliding window.

The above embodiments describe the fitting between the sliding windows corresponding to two positions, in one embodiment, the first curve is fitted by non-zero pixel points in the initial sliding window, and also the first curve is fitted by non-zero pixel points in the initial sliding window and non-zero pixel points in the sliding window corresponding to the second position. In one embodiment, the electronic device obtains the current position of the sliding window according to the first curve and the preset moving distance, thereby avoiding missing the curves that lead to inaccurate identification.

Figure 3:
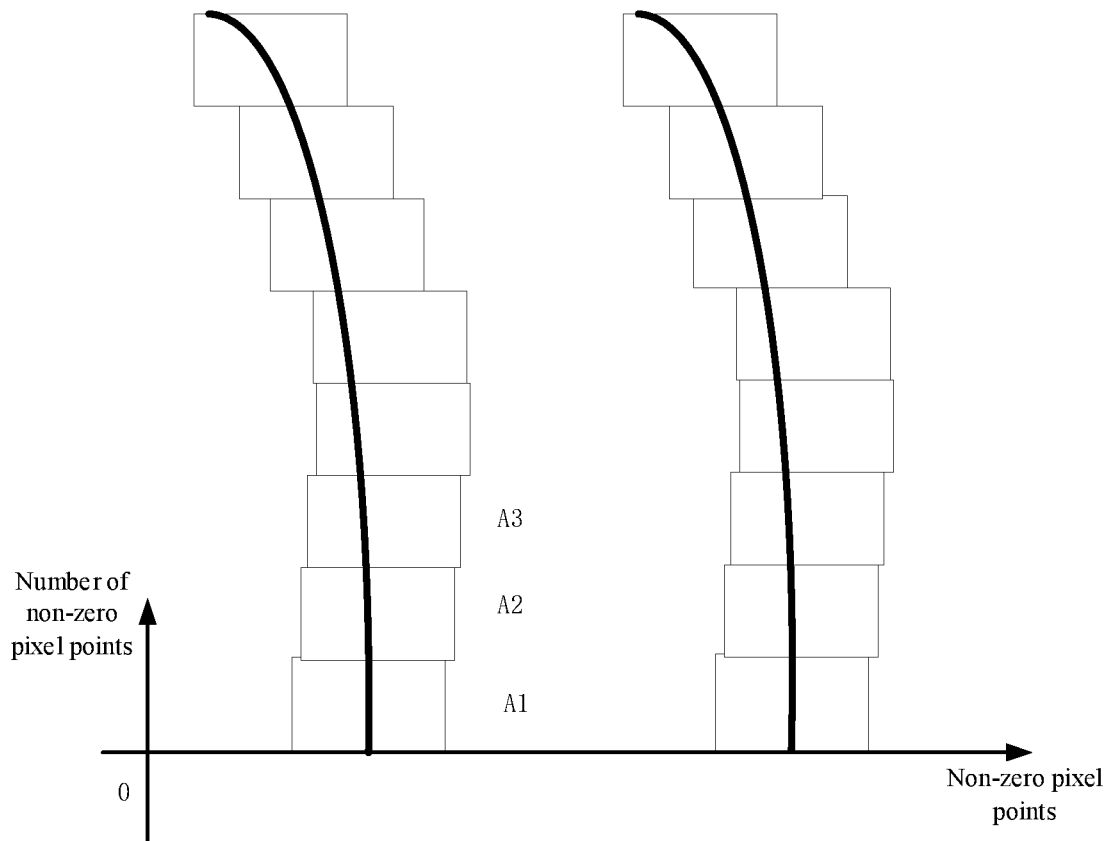
FIG. 3 shows a schematic diagram of a second curve obtained by fitting with sliding windows provided in an embodiment of the present application.

FIG. 3 is a schematic diagram of the third curve, and FIG. 3 shows a sliding window at a first position A1, a sliding window at a second position A2, and a sliding window at a third position A3, respectively. The electronic device establishes an image coordinate system for the aerial view, and the X-axis and the Y-axis are the abscissa and ordinate of the image coordinate system respectively.

In one embodiment, the fitting method of the left lane line and the right lane line is the same, the following embodiment takes the fitting of the left lane line as an example. Specifically, the electronic device obtains a curve F1 by using the least squares method and fits the non-zero pixels of the sliding window corresponding to the initial position, obtains a abscissa of a center of the sliding window corresponding to the second position (e.g., center position of the sliding window) according to a ordinate of the sliding window corresponding to the second position, and the curve F1. For example, the electronic device sets an ordinate of the vertex coordinates corresponding to the sliding window as the ordinate of the sliding window, and the ordinate of the vertex coordinates is determined according to the preset moving distance. The electronic device further calculates the number of non-zero pixel points of the sliding window corresponding to the second position and the coordinates of each non-zero pixel point, and uses the least squares method to fit a curve F2 according to the non-zero pixel points in the sliding window corresponding to the second position and the sliding window corresponding to the initial position. The electronic device obtains an abscissa of the sliding window corresponding to the third position according to an ordinate of the sliding window corresponding to the third position and the curve F2. The electronic device further calculates the coordinates of each non-zero pixel point of the sliding window of the third position and uses the least squares method to fit the non-zero pixel points in the sliding window corresponding to the first position, the non-zero pixel points in the sliding window corresponding to the second position, and the non-zero pixel points in the sliding window corresponding to the third position into curve F3. The electronic device obtains the second curve Fn by analogy, n represents the moving position of the sliding window.

According to the above embodiments, the electronic device can find the lane lines accurately during the vehicle moving at curves of the lane line of the road, thereby avoiding missing the curves that lead to inaccurate identification.

In block 27, the electronic device determines the left lane line according to the third curve corresponding to the left lane line, and determines the right lane line according to the forth curve corresponding to the right lane line.

In at least one embodiment, the electronic device searches for the lane lines by using the sliding window. The electronic device fits the first curve based on the non-zero pixel points covered by the sliding window before arriving at the current position, and determines the center of the sliding window according to the first curve, and the accuracy of searching the lane lines can be improved. Thus, the electronic device obtains the left lane line and searches for the third curve by determining an initial position of the left lane line as a search starting point, and obtains the right lane line and searches for the forth curve by determining an initial position of the right lane line as a search starting point.

In block 28, the electronic device calculates a first distance between the vehicle and the left lane line, and calculates a second distance between the vehicle and the right lane line.

Figure 4:
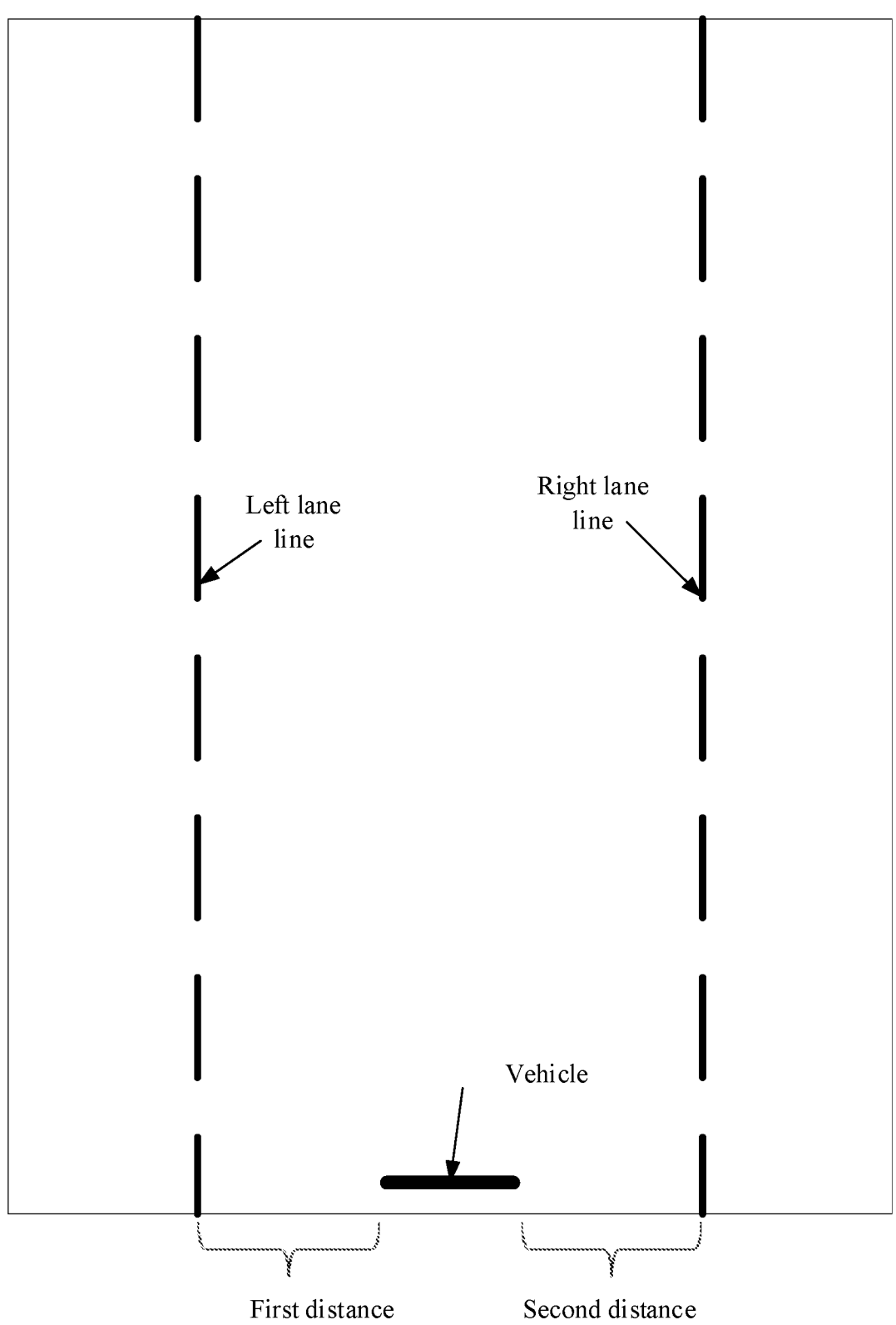
FIG. 4 shows a schematic diagram of a first distance and a second distance provided in an embodiment of the present application.

FIG. 4 shows a schematic diagram of a first distance and a second distance provided in an embodiment of the present application. The electronic device obtains a width of each lane line on the road according to a width standard of motor vehicle lanes. For example, the width of each motor vehicle lane on a multi-lane road above Grade 3 is 3.5 meters, the electronic device converts the pixel unit into the length unit according to a lane line fitting result, and compares a bottom median value of the left lane line and right lane line with a median value of the first foreground image. The electronic device calculates the width of the vehicle, subtracts the width of the vehicle from the distance between the left lane line and the right lane line, and obtains the sum of the first distance and the second distance. Specifically, the electronic device establishes a coordinate system, obtains the position of the left lane line and the position of the vehicle, and then obtains the first distance, and the position of the right lane line and the position of the vehicle, and then obtains the second distance.

In at least one embodiment, in response that the left lane is located at 85 pixel (e.g., 85 pixel represents a number of pixels in the horizontal direction), the right lane is located at 245 pixel, accordingly, the width between the left lane line and the right lane line is 160 pixel. The electronic device pre-corrects the position of the vehicle, so that the position of the vehicle is located in the middle of the first foreground image. For example, the leftmost position of the vehicle is located at 115 pixel, and the rightmost position of the vehicle is located at 205 pixel, thus, the first distance is 115 pixel-85 pixel, and the second distance is 245 pixel-205 pixel.

In block 29, the electronic device determines whether the vehicle deviates from any one of the left lane line and the right lane line, according to the first distance and the second distance.

In at least one embodiment, the electronic device calculates a first deviation proportion of the vehicle from the left lane line and a second deviation proportion of the vehicle from the right lane line according to the first distance and the second distance, and calculates an absolute value corresponding to a difference between the first deviation proportion and the second deviation proportion. In response that the absolute value corresponding to the difference is less than a deviation preset threshold, the electronic device determines that the vehicle does not deviate from any one of the left lane line and the right lane line. In response that the absolute value corresponding to the difference is greater than or equal to the deviation preset threshold, the electronic device determines that the vehicle deviates from one of the left lane line and the right lane line.

In at least one embodiment, the electronic device calculates a sum of the first distance and the second distance, and uses the sum of the first distance and the second distance as a third distance. The electronic device calculates a ratio of the first distance to the third distance, and uses the ratio of the first distance to the third distance as the first deviation proportion. The electronic device calculates a ratio of the second distance to the third distance, and uses the ratio of the second distance to the third distance as the second deviation proportion.

In at least one embodiment, in response that the first distance is represented as 115 pixel−85 pixel=30 pixel, and the second distance is 245 pixel−205 pixel=40 pixel, the electronic device obtains the third distance is 70 pixel according to the sum of the first distance (e.g., 30 pixel) and the second distance (e.g., 40 pixel), and calculates the first deviation proportion is represented as 30 pixel/70 pixel=0.43, and the second deviation proportion is represented as 40 pixel/70 pixel=0.57.

According to the calculation results of the first deviation proportion and the second deviation proportion, the electronic device calculates an absolute value corresponding to a difference between the first deviation proportion and the second deviation proportion is 0.14. It is assumed that the deviation preset threshold is 0.2, as the difference (e.g., 014) is less than the deviation preset threshold (e.g., 0.2), the electronic device determines that the vehicle does not deviate from any one of the left lane line and the right lane line. The deviation preset threshold may be adjusted according to actual requirement. Specifically, the deviation preset threshold may be a safe distance that the vehicle can be deviated.

In at least one embodiment, the electronic device recognizes the lane lines, determines the degree of deviation of the vehicle to ensure the safety of the vehicle. In response that the vehicle deviates greatly, the vehicle can be alarmed, especially can increase the effective driving basis for the unmanned driving system.

In at least one embodiment, the electronic device acquires a second foreground image at a second moment, the second moment is acquired after a first moment that acquires the first foreground image. The electronic device performs a distortion correction on the second foreground image and obtains a second corrected image. The electronic device extends the left lane line towards a first direction according to a preset extension distance, and obtains a first boundary, extends the right lane line towards a second direction according to the preset extension distance, and obtains a second boundary. The electronic device further divides regions on the second corrected image according to the first boundary and the second boundary, and determines a region of the left lane line and the right lane line in the second corrected image.

Figure 5:
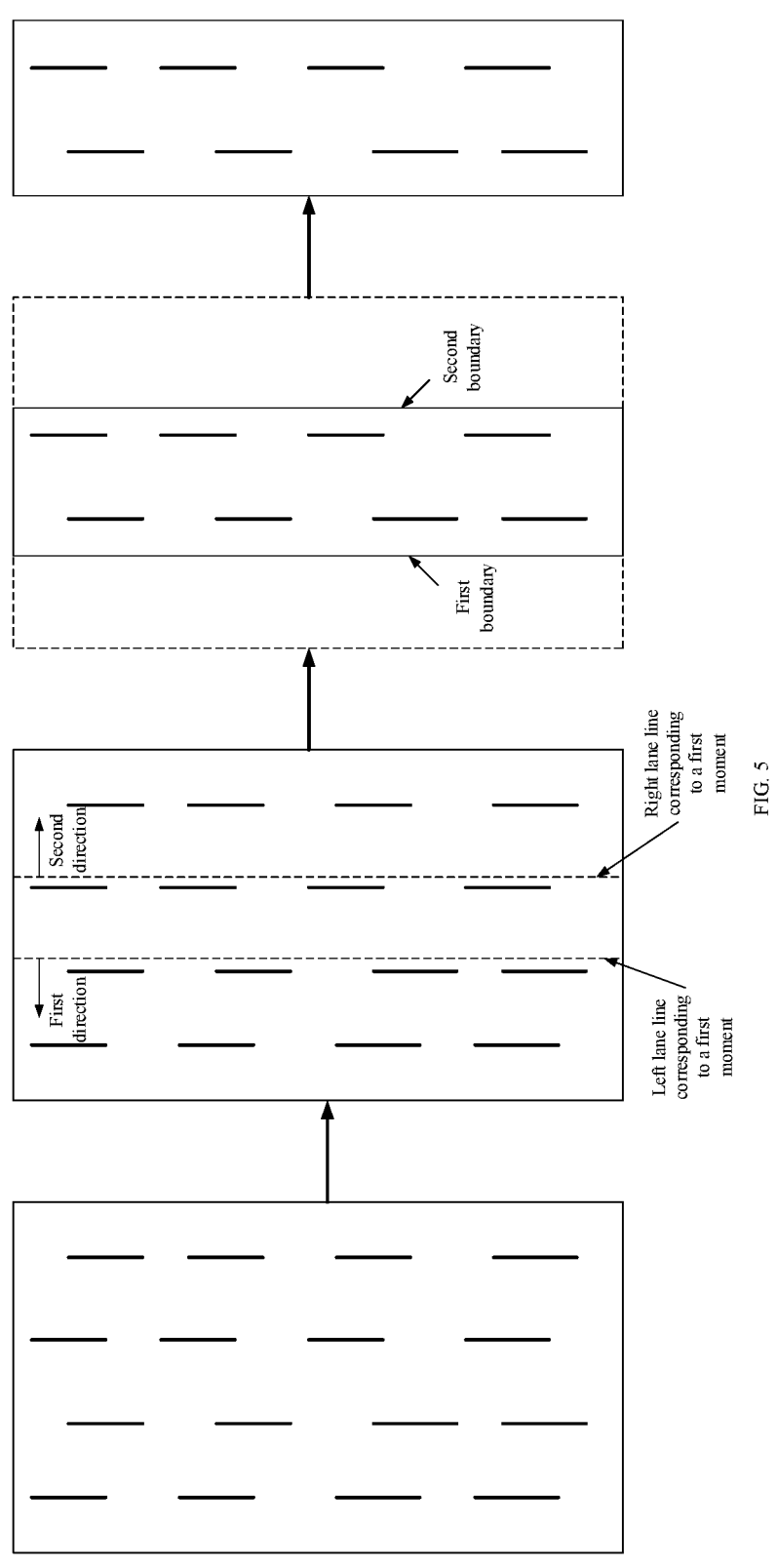
FIG. 5 shows a schematic diagram of a region where the lane line is located at a second moment provided in an embodiment of the present application.

FIG. 5 shows a schematic diagram of a region where the lane line is located at a second moment provided in an embodiment of the present application. The method described in this embodiment considers a continuity of the lane line and does not require a complete window search for each frame of the foreground image. After processing a frame at the first moment, the region where the lane line is located at the second moment can be predicted based on the left lane line and the right lane line obtained at the first moment. As shown in FIG. 5, the first boundary is determined based on the left lane line obtained at the first moment, and the second boundary is determined based on the right lane line obtained at the second moment, and the region between the first boundary and the second boundary is obtained by using the property of constant distance between the left lane line and the right lane line. The electronic device performs mask processing on other regions of the second foreground image obtained by the camera device, and setting the region between the first boundary and the second boundary as a lane of the road at the second moment, thereby improving the efficiency of detecting the lane lines.

In one embodiment, the electronic device fits the first curve according to non-zero pixel points covered by the sliding window while moving the sliding window and before arriving at a current position of the sliding window, and obtains a center position of the sliding window, the effectiveness of moving the sliding window is improved. The electronic device fits the second curve according to the first curve and non-zero pixel points covered by the sliding window at the current position, and obtains the left lane line and the right lane line at the first moment according to the second curve. Based on characteristics of the left lane line and the right lane line, the region where the lane lines of the second moment are located is obtained based on the lane lines obtained at the first moment, thereby improving the efficiency of detecting the lane lines. Moreover, the electronic device calculates the distance of deviation of the vehicle according to the left lane line and the right lane line, thereby ensuring the safety of vehicle during driving.

Referring further to FIG. 1, in this embodiment, the storage device 11 may be an internal memory of the electronic device 1, i.e., the storage device 11 is embedded in the electronic device 1. In other embodiments, the storage device 11 may also be an external memory of the electronic device 1, i.e., the storage device 11 is external connected to the electronic device 1.

In some embodiments, the storage device 11 is used to store program code and various data and to enable high-speed, automatic access to the program or data during operation of the electronic device 1.

The storage device 11 may include random access memory and may also include non-volatile memory such as a hard disk, memory, plug-in hard disk, Smart Media Card (SMC), Secure Digital (SD) card, Flash Card, at least one disk memory device, flash memory device, or other volatile solid state memory device.

In one embodiment, the at least one processor 12 may be a Central Processing Unit (CPU), and may also be other general purpose processors, Digital Signal Processor (DSP), Application Specific Integrated Circuit (ASIC), or other volatile solid state memory devices, Integrated Circuit (ASIC), Field-Programmable Gate Array (FPGA) or other programmable logic device, discrete gate or transistor logic device, discrete hardware component, etc. The general-purpose processor may be a microprocessor or the processor may also be any other conventional processor, etc.

The program code and various data in the storage device 11 may be stored in a computer readable storage medium if implemented as a software functional unit and sold or used as a separate product. Based on such an understanding, the present application realizes all or part of the processes in the method of the above-described embodiments, such as the lane line recognition method, which may also be accomplished by means of a computer program to instruct the relevant hardware, the computer program may be stored in a computer readable storage medium, and the computer program, when executed by a processor, may implement the blocks of each of the above-described method embodiments. Wherein the computer program includes computer program code, the computer program code may be in the form of source code, in the form of object code, in the form of an executable file or in some intermediate form, etc. The computer readable medium may include: any entity or device capable of carrying said computer program code, a recording medium, a USB stick, a removable hard disk, a diskette, an optical disk, a computer memory, a read-only memory (ROM, Read-Only Memory), etc.

It is understood that the division of modules described above is a logical functional division, and there can be another division in actual implementation. In addition, each functional module in each embodiment of the present application may be integrated in the same processing unit, or each module may physically exist separately, or two or more modules may be integrated in the same unit. The above integrated modules can be implemented either in the form of hardware or in the form of hardware plus software functional modules. The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for detecting vehicle deviation, the method comprising:

acquiring a first foreground image;

performing a distortion correction on the first foreground image and obtaining a first corrected image;

performing a perspective transformation on the first corrected image and obtaining an aerial view;

generating a distribution map of non-zero pixel points corresponding to the aerial view, based on a number of non-zero pixel points in each column of pixel points in the aerial view, the distribution map of non-zero pixel points is provided with a first peak and a second peak, and the first peak being on the left of the second peak;

determining an initial position of a left lane line in the aerial view according to the first peak, and determining an initial position of a right lane line in the aerial view according to the second peak;

determining the initial position of the left lane line and the initial position of the right lane line as a starting position of a sliding window respectively, and starting moving the sliding window in the aerial view from the starting position;

fitting a first curve corresponding to the left lane line and a second curve corresponding to the right lane line according to non-zero pixel points covered by the sliding window while moving the sliding window and before arriving at a current position of the sliding window respectively;

fitting a third curve corresponding to the left lane line according to the first curve corresponding to the left lane line and non-zero pixel points covered by the sliding window at the current position, comprising: calculating a abscissa of the center of the current position of the sliding window corresponding to the left lane line based on a movement distance of the sliding window at the current position corresponding to the left lane line and the first curve, determining non-zero pixel points within the sliding window at the current position corresponding to the left lane line based on the movement distance of the sliding window at the current position corresponding to the left lane line and the abscissa of the current position of the sliding window corresponding to the left lane line, and fitting the third curve corresponding to the left lane line according to the non-zero pixel points corresponding to the first curve and the non-zero pixel points within the sliding window at the current position corresponding to the left lane line, and fitting a fourth curve corresponding to the right lane line according to the second curve corresponding to the right lane line and non-zero pixel points covered by the sliding window at the current position, dynamically adjusting a movement of the sliding window according to the first curve and the second curve, comprising: calculating a abscissa of the center of the current position of the sliding window corresponding to the right lane line based on a movement distance of the sliding window at the current position corresponding to the right lane line and the second curve, determining non-zero pixel points within the sliding window at the current position corresponding to the right lane line based on the movement distance of the sliding window at the current position corresponding to the right lane line and the abscissa of the current position of the sliding window corresponding to the right lane line, and fitting the fourth curve corresponding to the right lane line according to the non-zero pixel points corresponding to the second curve and the non-zero pixel points within the sliding window at the current position corresponding to the right lane line;

determining the left lane line according to the third curve corresponding to the left lane line, and determining the right lane line according to the fourth curve corresponding to the right lane line;

calculating a first distance between a vehicle and the left lane line, and calculating a second distance between the vehicle and the right lane line; and determining whether the vehicle deviates from any one of the left lane line and the right lane line according to the first distance and the second distance.

2. The method of claim 1, wherein determining whether the vehicle deviates from any one of the left lane line and the right lane line according to the first distance and the second distance comprises:

calculating a first deviation proportion of the vehicle from the left lane line and a second deviation proportion of the vehicle from the right lane line according to the first distance and the second distance;

calculating an absolute value corresponding to a difference between the first deviation proportion and the second deviation proportion;

in response that the absolute value corresponding to the difference is less than a deviation preset threshold, determining that the vehicle does not deviate from any one of the left lane line and the right lane line;

in response that the absolute value corresponding to the difference is greater than or equal to the deviation preset threshold, determining that the vehicle deviates from any one of the left lane line and the right lane line.

3. The method of claim 2, wherein calculating the first deviation proportion of the vehicle from the left lane line and the second deviation proportion of the vehicle from the right lane line according to the first distance and the second distance comprises:

calculating a sum of the first distance and the second distance, and using the sum of the first distance and the second distance as a third distance;

calculating a ratio of the first distance to the third distance, and using the ratio of the first distance to the third distance as the first deviation proportion;

calculating a ratio of the second distance to the third distance, and using the ratio of the second distance to the third distance as the second deviation proportion.

4. The method of claim 1, further comprising:

acquiring a second foreground image at a second moment, the second moment being after a first moment that acquires the first foreground image;

performing a distortion correction on the second foreground image and obtaining a second corrected image;

extending the left lane line towards a first direction according to a preset extension distance, and obtaining a first boundary;

extending the right lane line towards a second direction according to the preset extension distance, and obtaining a second boundary;

dividing regions on the second corrected image according to the first boundary and the second boundary, and determining a region of the left lane line and the right lane line in the second corrected image.

5. The method of claim 1, wherein performing the distortion correction on the first foreground image and obtaining the first corrected image comprises:

establishing an image coordinate system for the first foreground image, and obtaining first coordinates of each non-zero pixel point on the first foreground image in the image coordinate system;

obtaining internal parameters of a camera device that captures the first foreground image, and determining second coordinates corresponding to the first coordinates according to the internal parameters and the first coordinates;

calculating a distortion distance between the first coordinates and coordinates of a center point of the first foreground image;

calculating an image complexity of the first foreground image according to a gray value of each pixel point on the first foreground image, and determining correction parameters of the first foreground image according to the image complexity;

determining a smoothing coefficient corresponding to the distortion distance and the correction parameters, according to a preset smoothing function;

smoothing the first coordinates according to the smoothing coefficient and the second coordinates, and obtaining the first corrected image.

6. The method of claim 5, wherein smoothing the first coordinates according to the smoothing coefficient and the second coordinates, and obtaining the first corrected image comprises:

determining a first weight of the first coordinates and a second weight of the second coordinates according to the smoothing coefficient;

calculating a first product of the first weight and the first coordinates, and calculating a second product of the second weight and the second coordinates;

smoothing the first coordinates according to a sum of the first product and the second product and obtaining the first corrected image.

7. The method of claim 1, wherein performing the perspective transformation on the first corrected image and obtaining the aerial view comprises:

using each non-zero pixel point in the first corrected image as a target point, calculating the target point according to a coordinate transformation formula and obtaining an inverse perspective transformation matrix;

obtaining the aerial view based on the inverse perspective transformation matrix.

8. The method of claim 1, wherein fitting the third curve corresponding to the left lane line according to the first curve corresponding to the left lane line and non-zero pixel points covered by the sliding window at the current position, and fitting the fourth curve corresponding to the right lane line according to the second curve corresponding to the right lane line and non-zero pixel points covered by the sliding window at the current position comprises:

obtaining the non-zero pixel points of the first curve and the second curve respectively;

calculating a number of the non-zero pixels in current sliding window;

in response that the number of the non-zero pixels in the current sliding window is greater than or equal to a preset threshold, fitting the third curve according to the non-zero pixel points of the first curve and non-zero pixel points in the current sliding window, and fitting the forth curve according to the non-zero pixel points of the second curve and non-zero pixel points in the current sliding window.

9. An electronic device comprising:

a processor; and a storage device that stories a plurality of instructions, which when executed by the processor, cause the processor to:

acquire a first foreground image;

perform a distortion correction on the first foreground image and obtain a first corrected image;

perform a perspective transformation on the first corrected image and obtain an aerial view;

generate a distribution map of non-zero pixel points corresponding to the aerial view, based on a number of non-zero pixel points in each column of pixel points in the aerial view, the distribution map of non-zero pixel points is provided with a first peak and a second peak, and the first peak being on the left of the second peak;

determine an initial position of a left lane line in the aerial view according to the first peak, and determine an initial position of a right lane line in the aerial view according to the second peak;

determine the initial position of the left lane line and the initial position of the right lane line as a starting position of a sliding window respectively, and start moving the sliding window in the aerial view from the starting position;

fit a first curve corresponding to the left lane line and a second curve corresponding to the right lane line according to non-zero pixel points covered by the sliding window while moving the sliding window and before arriving at a current position of the sliding window respectively;

fit a third curve corresponding to the left lane line according to the first curve corresponding to the left lane line and non-zero pixel points covered by the sliding window at the current position, comprising: calculate a abscissa of the center of the current position of the sliding window corresponding to the left lane line based on a movement distance of the sliding window at the current position corresponding to the left lane line and the first curve, determine non-zero pixel points within the sliding window at the current position corresponding to the left lane line based on the movement distance of the sliding window at the current position corresponding to the left lane line and the abscissa of the current position of the sliding window corresponding to the left lane line, and fit the third curve corresponding to the left lane line according to the non-zero pixel points corresponding to the first curve and the non-zero pixel points within the sliding window at the current position corresponding to the left lane line, and fit a fourth curve corresponding to the right lane line according to the second curve corresponding to the right lane line and non-zero pixel points covered by the sliding window at the current position, dynamically adjusting a movement of the sliding window according to the first curve and the second curve, comprising: calculate a abscissa of the center of the current position of the sliding window corresponding to the right lane line based on a movement distance of the sliding window at the current position corresponding to the right lane line and the second curve, determine non-zero pixel points within the sliding window at the current position corresponding to the right lane line based on the movement distance of the sliding window at the current position corresponding to the right lane line and the abscissa of the current position of the sliding window corresponding to the right lane line, and fit the fourth curve corresponding to the right lane line according to the non-zero pixel points corresponding to the second curve and the non-zero pixel points within the sliding window at the current position corresponding to the right lane line;

determine the left lane line according to the third curve corresponding to the left lane line, and determine the right lane line according to the fourth curve corresponding to the right lane line;

calculate a first distance between a vehicle and the left lane line, and calculate a second distance between the vehicle and the right lane line; and determine whether the vehicle deviates from any one of the left lane line and the right lane line according to the first distance and the second distance.

10. The electronic device of claim 9, wherein the processor is further caused to:

calculate a first deviation proportion of the vehicle from the left lane line and a second deviation proportion of the vehicle from the right lane line according to the first distance and the second distance;

calculate an absolute value corresponding to a difference between the first deviation proportion and the second deviation proportion;

in response that the absolute value corresponding to the difference is less than a deviation preset threshold, determine that the vehicle does not deviate from any one of the left lane line and the right lane line;

in response that the absolute value corresponding to the difference is greater than or equal to the deviation preset threshold, determine that the vehicle deviates from any one of the left lane line and the right lane line.

11. The electronic device of claim 10, wherein the processor is further caused to:

calculate a sum of the first distance and the second distance, and use the sum of the first distance and the second distance as a third distance;

calculate a ratio of the first distance to the third distance, and use the ratio of the first distance to the third distance as the first deviation proportion;

calculate a ratio of the second distance to the third distance, and use the ratio of the second distance to the third distance as the second deviation proportion.

12. The electronic device of claim 9, wherein the processor is further caused to:

acquire a second foreground image at a second moment, the second moment being after a first moment that acquires the first foreground image;

perform a distortion correction on the second foreground image and obtain a second corrected image;

extend the left lane line towards a first direction according to a preset extension distance, and obtain a first boundary;

extend the right lane line towards a second direction according to the preset extension distance, and obtain a second boundary;

divide regions on the second corrected image according to the first boundary and the second boundary, and determine a region of the left lane line and the right lane line in the second corrected image.

13. The electronic device of claim 9, wherein the processor is further caused to:

establish an image coordinate system for the first foreground image, and obtain first coordinates of each non-zero pixel point on the first foreground image in the image coordinate system;

obtain internal parameters of a camera device that captures the first foreground image, and determine second coordinates corresponding to the first coordinates according to the internal parameters and the first coordinates;

calculate a distortion distance between the first coordinates and coordinates of a center point of the first foreground image;

calculate an image complexity of the first foreground image according to a gray value of each pixel point on the first foreground image, and determine correction parameters of the first foreground image according to the image complexity;

determine a smoothing coefficient corresponding to the distortion distance and the correction parameters, according to a preset smoothing function;

smooth the first coordinates according to the smoothing coefficient and the second coordinates, and obtain the first corrected image.

14. The electronic device of claim 13, wherein the processor is further caused to:

determine a first weight of the first coordinates and a second weight of the second coordinates according to the smoothing coefficient;

calculate a first product of the first weight and the first coordinates, and calculate a second product of the second weight and the second coordinates;

smooth the first coordinates according to a sum of the first product and the second product and obtain the first corrected image.

15. A non-transitory storage medium having stored thereon at least one computer-readable instructions that, when executed by a processor of an electronic device, causes the processor to perform a method for detecting vehicle deviation, the method comprising:

acquiring a first foreground image;

performing a distortion correction on the first foreground image and obtaining a first corrected image;

performing a perspective transformation on the first corrected image and obtaining an aerial view;

generating a distribution map of non-zero pixel points corresponding to the aerial view, based on a number of non-zero pixel points in each column of pixel points in the aerial view, the distribution map of non-zero pixel points is provided with a first peak and a second peak, and the first peak being on the left of the second peak;

determining an initial position of a left lane line in the aerial view according to the first peak, and determining an initial position of a right lane line in the aerial view according to the second peak;

determining the initial position of the left lane line and the initial position of the right lane line as a starting position of a sliding window respectively, and starting moving the sliding window in the aerial view from the starting position;

fitting a first curve corresponding to the left lane line and a second curve corresponding to the right lane line according to non-zero pixel points covered by the sliding window while moving the sliding window and before arriving at a current position of the sliding window respectively;

fitting a third curve corresponding to the left lane line according to the first curve corresponding to the left lane line and non-zero pixel points covered by the sliding window at the current position, comprising: calculating a abscissa of the center of the current position of the sliding window corresponding to the left lane line based on a movement distance of the sliding window at the current position corresponding to the left lane line and the first curve, determining non-zero pixel points within the sliding window at the current position corresponding to the left lane line based on the movement distance of the sliding window at the current position corresponding to the left lane line and the abscissa of the current position of the sliding window corresponding to the left lane line, and fitting the third curve corresponding to the left lane line according to the non-zero pixel points corresponding to the first curve and the non-zero pixel points within the sliding window at the current position corresponding to the left lane line, and fitting a fourth curve corresponding to the right lane line according to the second curve corresponding to the right lane line and non-zero pixel points covered by the sliding window at the current position, dynamically adjusting a movement of the sliding window according to the first curve and the second curve, comprising: calculating a abscissa of the center of the current position of the sliding window corresponding to the right lane line based on a movement distance of the sliding window at the current position corresponding to the right lane line and the second curve, determining non-zero pixel points within the sliding window at the current position corresponding to the right lane line based on the movement distance of the sliding window at the current position corresponding to the right lane line and the abscissa of the current position of the sliding window corresponding to the right lane line, and fitting the fourth curve corresponding to the right lane line according to the non-zero pixel points corresponding to the second curve and the non-zero pixel points within the sliding window at the current position corresponding to the right lane line;

determining the left lane line according to the third curve corresponding to the left lane line, and determining the right lane line according to the fourth curve corresponding to the right lane line;

calculating a first distance between a vehicle and the left lane line, and calculating a second distance between the vehicle and the right lane line; and determining whether the vehicle deviates from any one of the left lane line and the right lane line according to the first distance and the second distance.

16. The non-transitory storage medium of claim 15, wherein determining whether the vehicle deviates from any one of the left lane line and the right lane line according to the first distance and the second distance comprises:

calculating a first deviation proportion of the vehicle from the left lane line and a second deviation proportion of the vehicle from the right lane line according to the first distance and the second distance;

calculating an absolute value corresponding to a difference between the first deviation proportion and the second deviation proportion;

in response that the absolute value corresponding to the difference is less than a deviation preset threshold, determining that the vehicle does not deviate from any one of the left lane line and the right lane line;

in response that the absolute value corresponding to the difference is greater than or equal to the deviation preset threshold, determining that the vehicle deviates from any one of the left lane line and the right lane line.

17. The non-transitory storage medium of claim 16, wherein calculating the first deviation proportion of the vehicle from the left lane line and the second deviation proportion of the vehicle from the right lane line according to the first distance and the second distance comprises:

calculating a sum of the first distance and the second distance, and using the sum of the first distance and the second distance as a third distance;

calculating a ratio of the first distance to the third distance, and using the ratio of the first distance to the third distance as the first deviation proportion;

calculating a ratio of the second distance to the third distance, and using the ratio of the second distance to the third distance as the second deviation proportion.

18. The non-transitory storage medium of claim 15, further comprising:

acquiring a second foreground image at a second moment, the second moment being after a first moment that acquires the first foreground image;

performing a distortion correction on the second foreground image and obtaining a second corrected image;

extending the left lane line towards a first direction according to a preset extension distance, and obtaining a first boundary;

extending the right lane line towards a second direction according to the preset extension distance, and obtaining a second boundary;

dividing regions on the second corrected image according to the first boundary and the second boundary, and determining a region of the left lane line and the right lane line in the second corrected image.

19. The non-transitory storage medium of claim 15, wherein performing the distortion correction on the first foreground image and obtaining the first corrected image comprises:

establishing an image coordinate system for the first foreground image, and obtaining first coordinates of each non-zero pixel point on the first foreground image in the image coordinate system;

obtaining internal parameters of a camera device that captures the first foreground image, and determining second coordinates corresponding to the first coordinates according to the internal parameters and the first coordinates;

calculating a distortion distance between the first coordinates and coordinates of a center point of the first foreground image;

calculating an image complexity of the first foreground image according to a gray value of each pixel point on the first foreground image, and determining correction parameters of the first foreground image according to the image complexity;

determining a smoothing coefficient corresponding to the distortion distance and the correction parameters, according to a preset smoothing function;

smoothing the first coordinates according to the smoothing coefficient and the second coordinates, and obtaining the first corrected image.

20. The non-transitory storage medium of claim 19, wherein smoothing the first coordinates according to the smoothing coefficient and the second coordinates, and obtaining the first corrected image comprises:

determining a first weight of the first coordinates and a second weight of the second coordinates according to the smoothing coefficient;

calculating a first product of the first weight and the first coordinates, and calculating a second product of the second weight and the second coordinates;

smoothing the first coordinates according to a sum of the first product and the second product and obtaining the first corrected image.

* * * * *